Patented Nov. 20, 1928.

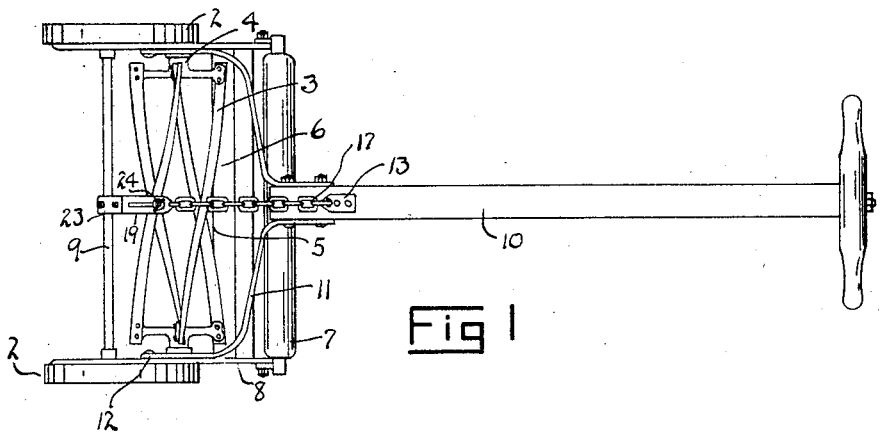
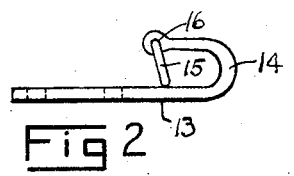
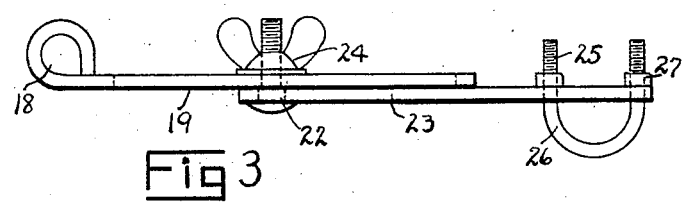
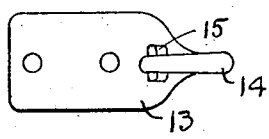
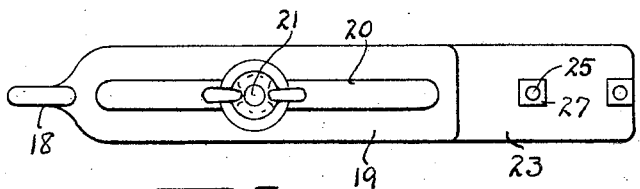

1,692,185

UNITED STATES PATENT OFFICE.

JAMES BENEDICT PAINE AND JAMES WILLOUGHBY SPRADLEY, OF SHERMAN, TEXAS.

ATTACHMENT FOR LAWN MOWERS.

Application filed December 9, 1926. Serial No. 153,706.

Our invention relates to an attachment for lawn mowers. It is applicable particularly to the ordinary household lawn mower adapted to be operated by hand.

In operating the ordinary hand propelled lawn mower, difficulty is commonly experienced in moving the lawn mower over uneven ground or on ground having a slope thereto, particularly when the lawn mower is operated with some speed. The difficulty experienced is in the vertical movement or vibration of the lawn mower and the cutting blades which causes the blades to cut unevenly, leaving small ridges or uneven spaces in the lawn. When the mower is thus operated the difficulty of propelling the same becomes greater as the vibration increases.

It is an object of our invention to provide a connection between the handle and the frame of the mower which is adapted to hold the cutting blades and the frame of the mower more rigid, thus overcoming the tendency to vertical movement or vibration.

It is desired to form such a connection between the handle and the frame as to allow adjustment of the connection longitudinally, in such manner as to set the tension upon the connecting member to accommodate the attachment for each individual mower and for different angles to the cutting blades relative to the ground.

Referring to the drawing herewith, Fig. 1 illustrates a top plan view of a lawn mower having our attachment applied thereto. Fig. 2 is a side elevation of an attaching bracket to be placed upon the handle of the mower. Fig 3 is a adjustable bracket for attachment to the frame of the mower. Fig. 4 is a top plan view of the bracket shown in Fig. 2, and Fig. 5 is a top plan view of the bracket shown in Fig. 3. Like numerals of reference are employed to designate like parts in all the views.

As will be noted from Fig. 1, the device is adapted for attachment to a lawn mower having the usual wheels 2 which support the frame of the mower and are geared to the frame of the cutters in the usual manner, so that the movement of the wheels in their progress along the ground will cause the rotation of the cutting blades 3. The cutting blades are mounted upon a frame having shafts 4 at each end connected for operation with the internal gears of the wheels 2. The blades 3 are spirally arranged in the usual manner and are adapted to rotate, bringing their outer cutting edges in contact with the edge 5 of the stationary blade 6. This construction is old and well known and need not be further illustrated or explained.

The frame is held in spaced relation relative to the ground by a rear roller 7 secured to the frame 8, which is in turn supported upon the inner stationary face of the frame which fits within the inner sides of the wheels 2. Between the supports 8 at the forward sides of the wheels 2 is a connecting rod 9. This rod is not rotatable, it spaces the wheels rigidly apart and is an important member in the frame work of the mower.

The handle 10 of the mower is connected by braces 11 with the frame 8 of the mower at a point 12 spaced somewhat toward the rear of the wheels. The connection 12 is a pivotal one, allowing a limited movement of the handle relative to the frame.

Our attachment is applied between the handle 10 and the spacing rod 9. An attaching bracket 13 is secured to the handle by screws or otherwise at a point adjacent the forward end of the handle. This bracket, as shown in Fig. 2, has an upwardly recurved forward end 14, the end of which is formed with an opening to receive a ring or link 15. Said link is free to move within said bracket but is of slightly greater length than the distance of the body of the bracket from the perforated end 16, thus preventing the ring from moving outwardly, allowing it to swing inwardly with a free movement.

The forward end of the bracket is adapted to receive one of the links of a chain 17, and it is contemplated that the end of the link may be forced inwardly past the link 15 of the bracket and when in position within the hooked portion 14 of the bracket the link 15 will drop backwardly and hold the chain against accidental detachment. It will be obvious that the attachment of the chain to the bracket 14 may be varied to employ any particular one of the links in the chain desired.

The chain is secured at its other end to a forward loop or eyelet 18 within a plate 19. Said plate 19 is provided with a longitudinal slot 20 to receive a bolt 21, the lower end of which is secured at 22 to a plate 23. The wing nut 24 on the bolt 21 may be employed to clamp the two plates 19 and 23 together in adjusted position in an obvious manner. The lower plate 23 has two openings therein toward the rear end which receive the upper arms 25 of a U-bolt 26. The lower portion of the U-bolt projects below the plate and is adapted to be secured above the spacing rod 9. Nuts 27 serve to secure the U-bolt in clamping engagement with the said rod 9.

In operating the lawn mower with our attachment the two brackets are secured in postion, the bracket 13 to the handle and the bracket 23 to the spacing rod 9, in longitudinal alignment. The chain is then secured between the two plates and the proper link in the chain is connected with the hooked end 14 of the handle bracket. The opposite end of the chain is then adjusted to draw the chain as tight as is desired by moving the upper plate 19 along the plate 23 and clamping the plates together by the use of the wing nut 24 when the proper tension has been placed upon the connecting chain. This connecting means serves to maintain a rigid connection between the frame and the handle so that when the mower is operated in the usual manner uneven places in the ground will not cause the usual vibration between the frame and the handle, but the tensioning device will hold the handle and frame against movement or vibration so that the running of the mower will be much more steady and even. This will not only allow the mower to cut more smoothly but will materially lessen the labor of operating the mower. It has been found that lawn mowers which ordinarily have a marked vibration, leading to poor results in cutting the grass, will when equipped with our attachment operate smoothly and steadily with much better results in the cutting operation of the mower and with less labor to the operator. The further advantages of this attachment will be obvious to those skilled in the art.

What we claim as new and desire to protect by Letters Patent is:

An attachment for a lawn mower having a handle and a rod bracing the two wheels, including in combination a bracket adapted for attachment to the handle, a plurality of plates adapted for attachment to the brace rod, a non-resilient connecting member between said bracket and said plates, a clevis for attaching said plates to said rod and a bolt retaining said plates in any desired adjustable position.

In testimony whereof we hereunto affix our signatures this the 23 day of November, A. D. 1926.

JAMES BENEDICT PAINE.
JAMES WILLOUGHBY SPRADLEY.